(12) United States Patent
Beer

(10) Patent No.: US 10,931,141 B2
(45) Date of Patent: Feb. 23, 2021

(54) DETECTION OF SETTING DEVIATIONS AT AN ENERGY MANAGEMENT SYSTEM

(71) Applicant: Bayerische Motoren Werke Aktiengesellschaft, Munich (DE)

(72) Inventor: Michael Beer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 173 days.

(21) Appl. No.: 15/428,309

(22) Filed: Feb. 9, 2017

(65) Prior Publication Data
US 2017/0229908 A1 Aug. 10, 2017

(30) Foreign Application Priority Data
Feb. 10, 2016 (DE) ..................... 10 2016 202 001.3

(51) Int. Cl.
*G05B 19/042* (2006.01)
*H02J 13/00* (2006.01)
(Continued)

(52) U.S. Cl.
CPC ...... *H02J 13/00028* (2020.01); *G05B 19/042* (2013.01); *G05D 23/1917* (2013.01); *H02J 7/35* (2013.01); *H02J 13/0017* (2013.01); *H02J 13/0079* (2013.01); *G05B 2219/25419* (2013.01); *Y02B 70/30* (2013.01);
(Continued)

(58) Field of Classification Search
CPC ...... H02J 13/0017; H02J 7/35; H02J 13/0079; H02J 2300/28; B60L 11/1861; B60L 55/00; B60L 53/14; B60L 58/13; G05B 19/042; G05B 2219/25419; G05D 23/1917;
(Continued)

(56) References Cited

U.S. PATENT DOCUMENTS

| 9,156,366 | B2 | 10/2015 | Kim | |
| 2011/0202221 | A1* | 8/2011 | Sobue | B60K 16/00 701/22 |
| 2011/0210613 | A1* | 9/2011 | O'Brien | H02J 3/32 307/82 |

(Continued)

FOREIGN PATENT DOCUMENTS

| DE | 10 2008 037 574 A1 | 7/2010 | |
| DE | 10 2012 007 126 A1 | 10/2013 | |
| KR | 20120107930 A | * 10/2012 | ............. G06Q 10/06 |

OTHER PUBLICATIONS

German Search Report issued in counterpart German Application No. 10 2016 202 001.3 dated Oct. 7, 2016 with partial English-language translation (twelve (12) pages).

*Primary Examiner* — Ryan A Jarrett
(74) *Attorney, Agent, or Firm* — Crowell & Moring LLP

(57) ABSTRACT

A process is provided for updating user settings in an energy management system for an electric and/or non-electric device. The energy management system has a communication interface, particularly a graphic user interface, for setting points in time concerning planned uses of the device. The process includes the steps of acquiring deviations between the points in time set on the part of the user and the actual points in time of using the device; evaluating the acquired deviations and deducing a possible systematic trend in the deviations, and displaying information to the user at the communication interface concerning a correction of already set future points in time concerning planned uses of the device.

12 Claims, 2 Drawing Sheets

(51) Int. Cl.
  *H02J 7/35* (2006.01)
  *G05D 23/19* (2006.01)
(52) U.S. Cl.
  CPC ............... *Y02E 10/76* (2013.01); *Y02E 40/70* (2013.01); *Y04S 10/123* (2013.01); *Y04S 20/242* (2013.01)
(58) Field of Classification Search
  CPC ... Y02E 10/766; Y02E 40/72; Y02B 70/3266; Y04S 20/242; Y04S 10/123
  See application file for complete search history.

(56) References Cited

U.S. PATENT DOCUMENTS

| | | | | |
|---|---|---|---|---|
| 2014/0257584 | A1* | 9/2014 | Tanimoto | G06Q 50/06 700/291 |
| 2014/0371937 | A1* | 12/2014 | Weaver | H02J 3/14 700/291 |
| 2015/0198345 | A1* | 7/2015 | Bicknell | G05B 15/02 700/276 |
| 2015/0355649 | A1* | 12/2015 | Ovadia | G05D 23/1917 704/233 |
| 2016/0258635 | A1* | 9/2016 | Zemach | F24D 19/1081 |
| 2017/0088000 | A1* | 3/2017 | Payne | B60L 11/1838 |

\* cited by examiner

DETECTION OF SETTING DEVIATIONS AT AN ENERGY MANAGEMENT SYSTEM

CROSS REFERENCE TO RELATED APPLICATIONS

This application claims priority under 35 U.S.C. § 119 from German Patent Application No. 10 2016 202 001.3, filed Feb. 10, 2016, the entire disclosure of which is herein expressly incorporated by reference.

BACKGROUND AND SUMMARY OF THE INVENTION

The invention, in general, relates to the field of energy management in conjunction with electric and non-electric supply systems and electric as well as non-electric consuming systems. In particular, the invention relates to the avoidance of deviations in user settings concerning future planned uses of an electric and/or non-electric device from actual usage points in time of the device at an energy management system for the electric system.

Current electric vehicle (e-vehicle)-specific functions include, in addition to the charge control, among others, also the possibility of utilizing the battery as a driving energy accumulator, and/or, even before the start of the drive, bringing the vehicle interior to an optimal operating temperature, by cooling or heating (pre-conditioning). The charge control makes it possible for the user to start and terminate the charging operation as well as to set the charging start by way of a charging timer in the vehicle or the desired departure time. The desired departure time, in addition to the preconditioning, can be used for an optimization of the charging operation by an energy management system. The pre-conditioning of the vehicle first ensures an optimal operating temperature of the battery and thereby a largest possible power output and thus a higher range. Furthermore, the term "pre-conditioning" also applies to a temperature control and air conditioning of the interior even before the start of the drive. The pre-conditioning can be started directly or the user defines the starting time for the pre-conditioning by way of a timer for the pre-conditioning.

For an optimal functioning of the above-discussed functions, such as the charge control and/or the preconditioning, or future energy management functions, such as, for example, solar-energy-optimized charging of the batteries of an e-vehicle or for providing control power to the energy supply network from the battery of the e-vehicle, the user has to set as precisely as possible any planned departure times and possibly charging requests, such as, for example, required energy quantities, at the energy management system.

German patent document DE 102012007126 A1 discloses, for example, a method and system for controlling the charging operation of an electric energy accumulator in a vehicle, wherein the course of time of conceivable charging operations is visualized, of which at least one was selected and/or meets a detected default. As a result, the user can immediately comprehend the charging process and can recognize alternative selection possibilities to the selected charging operation. A selected charging operation will be automatically implemented according to the detected default.

In connection with the above-mentioned functions, there is the basic problem that the required settings are seldom, for example, only once, carried out on the part of the user and can no longer be adapted to the real situations. The above-mentioned functions can therefore not be carried out correctly. For example, a reliable inclusion of the energy quantity situated in the energy accumulator of the e-vehicle in a superordinate network management system of an energy supply network (smart grid) or in a vehicle pool for providing control power is not possible. The pre-conditioning may, for example, take place at inappropriate times during which the user does not need it, or the vehicle is not yet pre-conditioned when the user needs the vehicle. It may, for example, occur that a requested vehicle charging is scheduled for a later time, so that an insufficient amount of energy was charged for the user at the actual earlier point in time. The result could therefore be that the user cannot reach his destination because of the insufficient charging of the battery.

It is an object of the present invention to provide an improved energy management process and an improved energy management system, by means of which the above-discussed problems can be reduced or completely avoided.

The object is achieved by means of the respective characteristics of the independent claims. Additional embodiments and advantageous further developments are obtained from the respective subclaims, the description and the drawings. Characteristics and details apply which were described in conjunction with the energy management process, and naturally also in conjunction with the corresponding energy management system and vice-versa respectively.

It is a central idea of the invention to detect and/or deduce deviations between time-related settings for planned uses of the device on the part of the user and the then actual points in time of the use, for a better planning of the energy demand of an electric and/or non-electric device, such as preferably an e-vehicle. The user can then actively be prompted to update the settings. Based on deviations over an extended time period, it may be possible to recognize a systematic trend with respect to the deviations. Based on detected systematic deviations, the user can also be prompted to update the settings. Furthermore, it is contemplated to suggest to the user quantitative corrections of the settings. Finally, automatic corrections of the settings are also contemplated based on the detected systematic deviations.

A first aspect of the invention relates to a process for updating user settings in an energy management system of a system having an electric and/or non-electric device.

The energy management system has or is connected with a communication interface for setting points in time concerning planned uses of the device. The communication interface preferably is a graphic user interface, for example, having a touch-sensitive video screen (touch display). Thus outputs by displays of graphic information to the user are provided as well as inputs concerning displayed graphic control elements by the user. For the inputs on the part of the user, in addition to the touch display or, alternatively, as a supplement to a graphic display without contact functionality, separate keys or knurled adjusting wheels known per se may also be provided. It is an alternative or additional possibility that the user can initiate settings by way of a software application or website which, in a manner known per se, is implemented on a computer or mobile minicomputer, such as a smartphone. In this case, the smartphone can be communicatively connected with the energy management system by way of a mobile data connection directly by way of a close-range connection, such as WLAN, Bluetooth, ZigBee, etc., or indirectly by way of a connection via the Internet.

The process according to the invention has the following steps:

Detecting of deviations between the points in time set by the user and the actual points in time of the use of the device;

evaluating the detected deviations in order to deduce or recognize a conceivable systematic trend concerning the deviations; and informing the user by way of the communication interface concerning a correction of already set future points in time for planned uses of the device.

In other words, based on the detected deviations, the energy management system can prompt the user of the device to update the settings. For example, the following prompt could be displayed to the user on a display of the communication interface: "Your settings deviate from the real starting time of the use. Please adapt your settings."

Preferably, the information step may feature a displaying of a quantitative correction suggestion to the user for at least one already set future point in time concerning a planned use of the system.

In other words, the energy management system, while taking into account a detected systematic trend in the detected deviations, may suggest to the user a correspondingly concrete correction. For example, the following prompt could be displayed to the user on a display of the communication interface: "A deviation was detected. The following adaptation of the starting time (day, time of day) is suggested".

Preferably, the information step may further feature an automatic correcting of at least one already set future point in time concerning a planned use of the device. Particularly preferably, a querying of a confirmation of the automatic correction on the part of the user may be provided by a corresponding input at the communication interface. For example, for this purpose, the following could be displayed to the user on the display of the communication interface: "A deviation was detected and corrected. Should the adaptation be applied"?

The user may also be queried as to whether he basically agrees with an automatic correction of the settings. Thus, the following could be displayed to the user on the display of the communication interface: "Should adaptations always be carried out automatically"? However, to ensure safety, preferably, the user is informed of every automatic adaptation.

The above-mentioned functions can also take place in several steps. For example, the user can first be informed of a detected deviation. Subsequently, a correction suggestion can be displayed to him, etc.

The device may preferably be a heating system, particularly preferably a heat pump heating system, whose usage points in time can basically be planned. Space booking systems exist, for example, with a coupling to a building energy management system. If a space is booked, the temperature will be raised to a predefined value at the booking time. If the usage time is not observed, loss of comfort for the user or increased energy losses may occur.

In the case of a special implementation of the process, the electric device is an electric vehicle having a battery, preferably with a rechargeable electric vehicle battery for autonomously supplying the electric vehicle with electric current.

The energy management system may then be equipped for charging the battery at the points in time of set planned uses of the electric vehicle to a predeterminable state of charge. In this case, it may basically be provided that a predetermined state of charge is to completely charge the battery. However, it is also contemplated to use a state of charge corresponding to the planned use extent of the device for determining the state of charge that is required and therefore is to be made available. Likewise, it is contemplated that the desired state of charge, like the planned usage point in time, can be set on the part of the user for the respective planned use.

The electric vehicle may correspondingly have at least one of the following system functions: A battery charging function, by means of which the battery of the electric vehicle can be charged to a defined state of charge at a predetermined point in time: a first pre-conditioning function, by means of which the battery can be brought to an optimal operating temperature at a predetermined point in time: a second pre-conditioning function, by means of which an interior of the electric vehicle can be temperature-controlled and/or air-conditioned for a predetermined point in time.

In conjunction with an electric vehicle, the invention achieves the following advantages: (a) Optimization of the charging plan for charging the battery becomes more precise: (b) energy consumption is minimized; and (c) avoidance of a complete breakdown of the vehicle is improved.

A second aspect of the invention relates to a computer program having software for implementing a process for updating user settings in an energy management system according to the first aspect when the computer program is implemented in a computer system in which the energy management system is also implemented in a programming-related manner.

A third aspect of the invention relates to an energy management system for a system with an electric and/or non-electric device. The energy management system has a user interface with input devices, particularly a touch display and/or setting keys/adjusting wheels or web-based technologies, which, among others, are arranged for the input of points in time concerning planned uses of the device by a user, and with output devices, particularly the display of the touch displays or a display that is arranged for indicating settings of the energy management system to a user. The energy management system further has a processor which, relative to programs, is arranged with a program code such that when the program code is implemented on the processor, the processor carries out a process according to the first aspect of the invention.

By way of a data interface, preferably by way of the Internet, the energy management system can be directly or indirectly communicatively connected with a network management device of an energy supply network or a local energy management system and can further be arranged for taking into account user settings on the part of the user concerning planned uses of an electric device having an electric energy accumulator, such as a battery, when using the energy accumulator for providing control power for stabilizing the network frequency in the energy supply network. As an alternative, when charging the battery, the energy management system can utilize the planned usage points in time such that the energy required for charging the battery, if possible, is obtained from a supply network at times at which a cost rate applies that is as favorable as possible, or the energy can be obtained from alternative energy sources, such as a solar system.

A fourth aspect of the invention relates to an electric vehicle or a hybrid vehicle or a heating system, preferably a heat pump heating system, having an energy management system or coupled with an energy management system according to the third aspect of the invention.

1 Finally, it should be noted that the process according to the invention or the energy management system according to the invention can be used not only in the automotive field in conjunction with e-vehicle but can also be applied to other electric and non-electric devices, which are connected to an energy management system for the optimization of energy/load. These can, for example, be the above-mentioned household appliances.

Other objects, advantages and novel features of the present invention will become apparent from the following detailed description of one or more preferred embodiments when considered in conjunction with the accompanying drawings.

Components that are identical or have similar functions are provided with the same reference numbers. The illustrated and described embodiment should not be considered as final, but is an example for explaining the invention. The description has the purpose of informing the person skilled in the art. Therefore, known structures and methods will not be shown in detail or explained in the following description, in order not to make comprehension difficult.

DETAILED DESCRIPTION OF THE DRAWINGS

Figure 1:
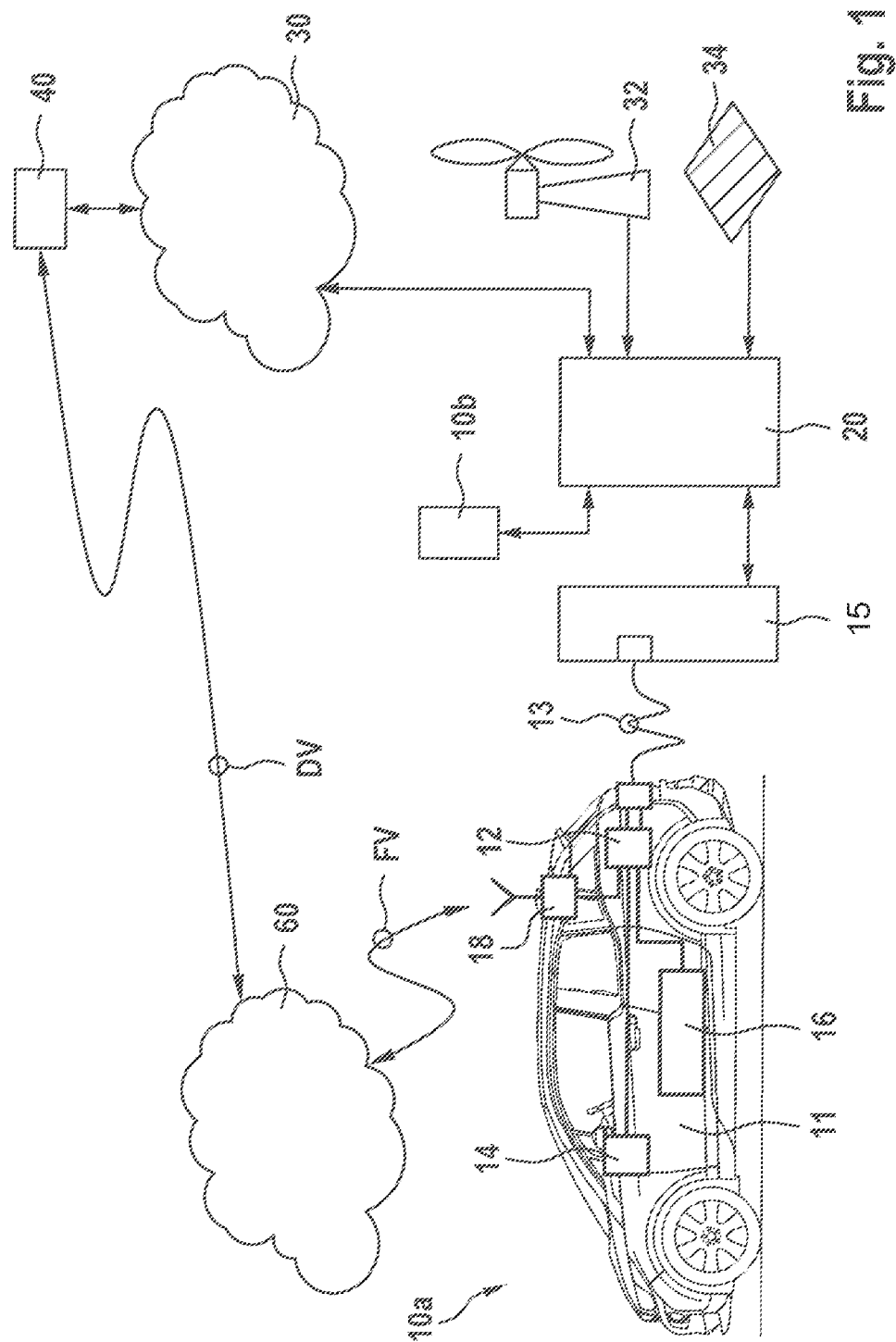
FIG. 1 illustrates an embodiment with an electric vehicle as an electric device with an energy management system according to the invention for carrying out the energy management process according to the invention.

FIG. 1 illustrates an embodiment with an e-vehicle as the electric device 10a, which has an energy management system 12 for implementing an energy management process. The illustration of FIG. 1 is highly simplified and has the purpose of essentially better indicating the context in which the present invention is embedded. A more detailed illustration of the individual components of FIG. 1 is not necessary for understanding the present invention.

In addition to the known components of an e-vehicle that are not relevant here, the e-vehicle 11 has a battery 16 as an accumulator for electric energy and the above-mentioned energy management system 12 with a user interface 14.

The user interface 14 may also be part of a driver information system known per se and present anyhow in modern vehicles, wherein the energy management system 12 is then linked thereto by way of a corresponding data link or, as an alternative, is also implemented therein with respect to programming.

The user interface 14 essentially has input devices which, among other things, is arranged for the input of points in time concerning planned uses of the e-vehicle 11 by a user. The user interface 14 further has output devices which are arranged for displaying settings of the energy management system 12 to a user. Particularly advantageously, the user interface 14 is a touch display of the above-mentioned driver information system or a software application on a computer or mobile minicomputer. Basically, the functionality of the energy management system 12 can also be integrated in the driver information system or in another already existing control system of the vehicle.

In FIG. 1, the e-vehicle 11 is shown in a situation in which it is coupled by way of a charging connection, such as a charging cable 13, with a charging station 15. The charging cable 13 connects the energy management system 12, which is also used as a charge control for the battery 16 of the e-vehicle 11, with the charging station 15. The charging station 15 is connected to an energy supply system 20, for example, a multi-occupant building, a private residence or a parking garage or the like. For providing electric energy, the energy supply system 20 is electrically connected with a power supply network 30 as well as alternative energy sources, such as a wind power plant 32 or a solar system 34.

The power supply network 30 is also illustrated in a very simplified fashion and connected with a network management system 40. The goal of the energy supply system 20 is, among other things, on the one hand, to use as much energy as possible for the charging of the battery 16 of the e-vehicle from the alternative energy sources 32, 34 and/or to obtain it only at times during which the current from the power supply network 30 is reasonable. On the other hand, the energy supply system 20, if required, should be able to provide the power supply network 30 with power on the part of the alternative energy sources 32, 34 and/or on the part of the battery 16 of the e-vehicle 11 coupled with the charging station 14. Future network management strategies provide, among other things, to use the then numerously available batteries 16 of the e-vehicles 11 as buffer memories for currently excessive energy and/or as a source of required control power in the power supply network 30.

For this purpose, it is necessary that the planned uses of an e-vehicle are known to the network management system 40 of the power supply network 30. Likewise, the energy management system 12 has to know the planned uses of an e-vehicle 11 in order to be able to control the initially mentioned specific functions of the e-vehicle 11, such as the charging control and the pre-conditioning, as intended and in an optimal fashion.

For this purpose, the energy management system 12 can be communicatively directly or indirectly connected by way of a data transmission interface 18 with the network management system 40 of the energy supply network 30. A direct data connection is conceivable by way of the Internet 60, to which the e-vehicle 11 is linked by way of the data transmission interface 18 by way of an air interface/radio connection FV. The network management system 40 is also linked to the Internet 60 by way of a data connection DV. An indirect connection is conceivable, for example, by way of a data connection integrated in the charging cable 13, for example, according to the Ethernet-over-power line principle, because the charging station 14 is connected with the power supply network 30 by way of the energy supply system 20, with which power supply network 30 the network management system 40 is also connected.

The energy management system 12 has a processor which, relative to programming, by means of the program code, is arranged in a known manner such that, when the program code is implemented on the processor, the latter carries out a process according to the invention for updating user settings in an energy management system 12, as will be explained in the following. In other words, the energy management system 12 can be implemented via programming in each already present control system with a computer infrastructure.

According to the invention, the energy management system 12 is now programmed in order to ensure that, to the extent possible, user settings on the part of the user concerning planned uses of the e-vehicle 11, do not deviate from the actual points in time of the use.

For this purpose, the energy management system 12, with respect to programming, is configured for implementing a process for updating user settings in the energy management system 12. As already explained above, the user of the e-vehicle 11 can set points in time concerning planned uses of the e-vehicle 11 at the energy management system 12 by way of the communication interface 14. These settings will then be taken into account on the part of the energy management system 12 in the case of the known and, as required, future e-vehicle-specific functions, such as the charging control, pre-conditioning, solar-optimized charging, providing control power to the power supply network 30 and much more.

With respect to the charging control, the energy management system 12 is first arranged for charging the battery 16 at the points in time of set planned uses of the e-vehicle 11 to a predeterminable state of charge. As addressed above, it is also conceivable that, in addition to the planned usage points in time, the user makes an energy demand, for example, as a percentage of the battery capacity and/or by way of indicating the planned driving route.

Figure 2:
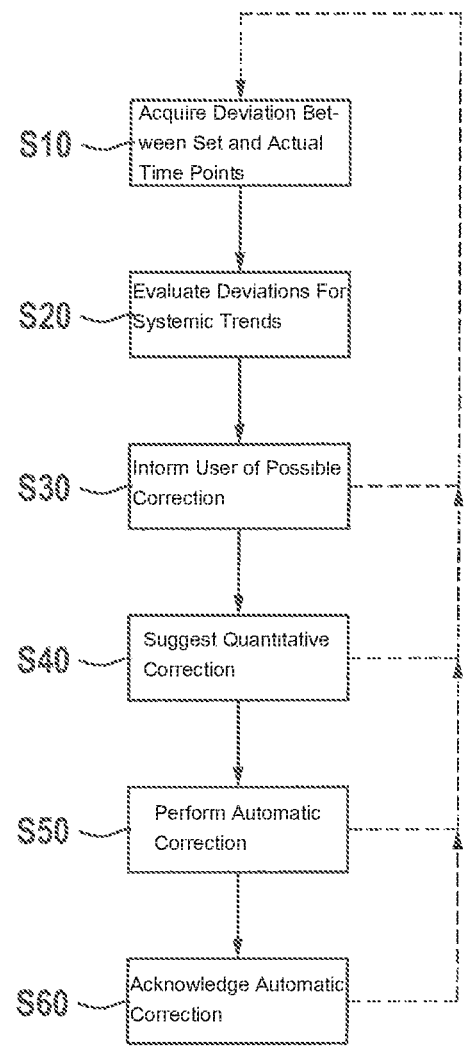
FIG. 2 is a flow chart of the process according to the invention for updating user settings in an energy management system of an electric system.

In order to avoid the initially mentioned deviations in the case of the usage points in time set by the user and the actual usage points in time, the energy management system 12 is arranged for implementing the process according to the invention for the updating of user settings. A simplified flow chart of the process is illustrated in FIG. 2.

In Step S10, first, deviations between the points in time set on the part of the user and the actual points in time of the use of the e-vehicle are acquired. For this purpose, on the one hand, the absolute fault between the set times and the actual use time can be stored.

It is advantageous for the further evaluation (Step S20) of the deviations with respect to possible systematic trends to also acquire the weekdays as well as possibly the context of the use, such as the length of the travel route, in order to recognize patterns in the user behavior and be able to therefrom possibly predict deviations. It would be a trivial example that the user's clock is set wrong, and a certain deviation therefore occurs regularly. This can be recognized and be taken into account.

In order to detect deviations in the user settings from the real user behavior, the user behavior can preferably regularly gauge/acquire the absolute deviation by way of a previously defined, possibly changeable number of deviations. In this case, a one-time and/or first-time exceeding/falling below of a defined positive and/or negative threshold value does not yet lead to a correction suggestion or an automatic adaptation.

The measured variable for the deviation can be the difference of a respective value set by the user for the planned use preferably with respect to the median or alternatively to the average value of the real values for the set number of situations; i.e. the evaluation can be established therefrom for the totality of all checks or abstracts. It may, for example, make sense to differentiate between weekdays as planned use times for departure times set by the user. If, for example, the departure time, for example, for work, is observed on certain weekdays, such as Mondays through Thursdays, but on a certain other day, such as Friday, it is not observed, a suggestion or an adaptation will take place only for target dates on that certain day and not for all target dates.

In Step S20, the acquired deviations are evaluated in order to deduce or recognize a possible systematic trend in the deviations.

Based on detected deviations, as a first measure in a Step 30, the user is informed by way of the communication interface 14 concerning a conceivable correction of already set future points in time for planned uses of the e-vehicle; i.e. should it only be possible to recognize that the set planned points in time for uses of the e-vehicle 11 are (for example, frequently) wrong, it definitely makes sense to prompt the user by way of the communication interface 14 to possibly correct the already set future points in time for planned uses of the e-vehicle 11 or at least remind him in this respect.

If, for example, a repetitive deviation occurs in the deviations, i.e. a systematic trend can be recognized, the information Step S30 may further have a Step S40, in which a quantitative correction suggestion for at least one already set future point in time concerning a planned use of the vehicle 11 is displayed to the user.

For example, a user could have regularly scheduled a vehicle use for a certain weekday, for example, for attending a sports lesson on Thursday from 20:00 to 22:00. When the time window has shifted, for example, because the lesson now takes place from 19:00 to 21:00, but the user has not updated this change in the energy management system 12, the deviation by one hours ("correction suggestion: −1 h") can be quantitatively defined or deduced as a systematic deviation. The user can then be presented with the corresponding quantitative correction suggestion, specifically, to correct the planned use point in time by "1 hour."

Likewise, when such a systematic deviation was detected, in Step S50, an automatic correction of at least one already set future point in time concerning a planned use of the e-vehicle can take place. In the case of the automatic correction in Step S50, a Step S60 is further provided, in which an acknowledgment of the automatic correction on the part of the user is requested by a corresponding input at the communication interface 14.

As outlined in FIG. 2, the process always returns to Step S10 in order to detect new deviations and, as discussed above, evaluate them and, as required, prompt the user or make change/correction suggestions.

It should also be noted that the process described here in conjunction with an e-vehicle 11 can naturally also be correspondingly used with other electric and non-electric devices 10*b*, such as a heating system, preferably a heat pump heating system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for updating user settings in an energy management system of an electric and/or non-electric device, the process comprising the acts of:
   receiving, from a user via a communication interface of the energy management system, one or more scheduled usage times at which the device is scheduled to be used by the user;
   detecting deviations between the scheduled usage times and corresponding actual usage times, wherein the actual usage times reflect when the device was actually used by the user;
   evaluating a history of detected deviations in order to determine a systematic trend in the deviations; and
   informing the user, by way of the communication interface, concerning a correction of future scheduled usage times, in response to the systematic trend in the deviations being determined.

2. The process according to claim 1, wherein the informing act comprises displaying a quantitative correction suggestion to the user for at least one already set future scheduled usage time concerning a planned use of the electric device.

3. The process according to claim 1, wherein the informing act comprises automatically correcting at least one already set future scheduled usage time concerning a planned use of the electric device.

4. The process according to claim 3, further comprises the act of:
querying an acknowledgment of the automatic correction on the part of the user by a corresponding input at the communication interface.

5. The process according to claim 1, wherein the device is a heating system.

6. The process according to claim 1, wherein the device is a heat pump heating system.

7. The process according to claim 1, wherein
the device is an electric vehicle having a battery for supplying the electric vehicle with electric power,
the energy management system is arranged for charging the battery at the scheduled usage time to a predeterminable state of charge, and
the electric vehicle has at least one system function from the group consisting of: (i) a battery charging function, by which the battery of the electric vehicle at a predetermined point in time can be charged to a defined state of charge, (ii) a first pre-conditioning function, by which the battery at a predetermined point in time can be brought to an optimal operating temperature, and (iii) a second pre-conditioning function, by which an interior of the electric vehicle can be temperature-controlled and/or air-conditioned.

8. An energy management system for a device having an energy accumulator for electric energy, a user interface with input devices and output devices, and a processor, which executes program code to:
receive, from a user via the input devices of the user interface, one or more scheduled usage times at which the device is scheduled to be used by the user;
detect deviations between scheduled usage times and corresponding actual usage times at which the device is actually used by the user;
evaluate a history of detected deviations in order to determine a systematic trend in the deviations; and
inform the user by way of the output devices of the user interface concerning a correction of future schedule usage times, in response to the systematic trend in the deviations determined.

9. The energy management system according to claim 8, wherein the energy management system is communicatively connected directly or indirectly by way of a data interface with a network management system of an energy supply network, and is further arranged for taking into account user settings on the part of the user concerning planned uses of the device while using the energy accumulator for providing control power for stabilizing the network frequency in the energy supply network.

10. The energy management system according to claim 8, wherein the energy management system is configured for a device that is an electric vehicle, a hybrid vehicle or a heating system.

11. The energy management system according to claim 10, wherein the heating system is a heat pump system.

12. A computer product comprising a non-transitory computer readable medium having stored thereon program code that, when executed by a processor in an energy management system for a device having an energy accumulator for electric energy, a user interface with input devices and output devices, causes the processor to:
receive, from a user via the input devices of the user interface, one or more scheduled usage times at which the device is scheduled to be used by the user;
detect deviations between the scheduled usage times and corresponding actual usage times, wherein the actual usage times reflect when the device was actually used by the user;
evaluate a history of detected deviations in order to determine if there is a systematic trend in the deviations; and
inform the user by way of the output devices of the user interface concerning a correction of future scheduled usage times, in response to the systematic trend in the deviations being determined.

* * * * *